US 8,065,620 B2

(12) United States Patent
Chen et al.

(10) Patent No.: US 8,065,620 B2
(45) Date of Patent: Nov. 22, 2011

(54) SYSTEM AND METHOD FOR DEFINING AND PRESENTING A COMPOSITE WEB PAGE

(75) Inventors: Kaihu Chen, Lake Grove, NY (US); George Hong Zhi Hsu, Levittown, NY (US)

(73) Assignee: Computer Associates Think, Inc., Islandia, NY (US)

( * ) Notice: Subject to any disclaimer, the term of this patent is extended or adjusted under 35 U.S.C. 154(b) by 1105 days.

(21) Appl. No.: 10/066,037

(22) Filed: Jan. 31, 2002

(65) Prior Publication Data

US 2003/0005002 A1    Jan. 2, 2003

Related U.S. Application Data

(60) Provisional application No. 60/265,223, filed on Jan. 31, 2001.

(51) Int. Cl.
G06F 17/40 (2006.01)
G06F 3/048 (2006.01)
(52) U.S. Cl. ......... 715/744; 715/238; 715/731; 715/853
(58) Field of Classification Search .................. 715/763, 715/762, 513, 735, 741, 515, 760, 825, 853, 715/514, 238, 731, 744
See application file for complete search history.

(56) References Cited

U.S. PATENT DOCUMENTS

| | | | | |
|---|---|---|---|---|
| 6,012,098 A | | 1/2000 | Bayeh et al. | 709/246 |
| 6,081,263 A | * | 6/2000 | LeGall et al. | 715/760 |
| 6,101,509 A | * | 8/2000 | Hanson et al. | 715/513 |
| 6,112,242 A | | 8/2000 | Jois et al. | 709/225 |
| 6,792,475 B1 | * | 9/2004 | Arcuri et al. | 709/245 |
| 6,938,205 B1 | * | 8/2005 | Hanson et al. | 715/526 |
| 6,976,210 B1 | * | 12/2005 | Silva et al. | 715/205 |
| 7,031,968 B2 | * | 4/2006 | Kremer et al. | 707/100 |
| 7,085,994 B2 | * | 8/2006 | Gvily | 715/500.1 |
| 2002/0018078 A1 | * | 2/2002 | Khan et al. | 345/762 |
| 2003/0234816 A1 | * | 12/2003 | Rosen et al. | 345/762 |

OTHER PUBLICATIONS

U.S. Appl. No. 60/209,873, Khan et al.*
PCT Search Report for PCT/US02/02971, 6 pages, Aug. 4, 2005.
EPO Summons to attend oral proceedings pursuant to Rule 115(1) EPC; Reference: HCD/KT/J45683EP; Application No./Patent No. 02709277.4-1527/1395896, Nov. 13, 2008.
EPO Communication pursuant to Article 96(2) EPC; Reference: HCD/KT/J45683EP; Application No. 02 709 277.4-1527, Sep. 1, 2005.
EPO Search Report under Rule 112 EPC; Reference: HCD/KT/J45683EP; Application No./Patent No. 02709277.4, Dec. 10, 2004.

(Continued)

Primary Examiner — Namitha Pillai
(74) Attorney, Agent, or Firm — Baker Botts L.L.P.

(57) ABSTRACT

A method for defining a composite web page is disclosed which includes identifying a web page referencing at least one associated element. The method further includes analyzing the web page to determine a list of the associated elements and presenting the list to a user. A user selection of one or more associated elements from the list is received and registered for later retrieval. A method for presenting a composite web page is also disclosed. Systems and computer-readable storage media for defining and presenting a composite web page are also disclosed.

25 Claims, 9 Drawing Sheets

OTHER PUBLICATIONS

"Dynamic Creation of Multimedia Web Views on Heterogeneous Information Sources," Atsuyuki Morishima et al.; System Sciences, 2000, Piscataway, NJ, USA, IEEE, Jan. 4, 2000, pp. 2000-2009, Jan. 4, 2000.

"XWRAP: An XML-enabled Wrapper Construction System for Web Information Sources," Ling Liu, Calton Pu, Wei Han; Internet 2000 IEEE 16th International Conference on Data Engineering (ICDE '00), [Online] Feb. 29, 2000-Mar. 3, 2000, pp. 611-621.

"Modeling Web Sources for Information Integration," Craig A. Knoblock et al.; Internet/Proceedings of AAAI Conference 1998, [Online] 1998.

Computer Networks and ISDN Systems 27 (1996) 1493-1499—"Ubiquitous advertising on the WWW: Merging advertisement on the browser," Youji Kohda, Susumu Endo, 1996.

* cited by examiner

SYSTEM AND METHOD FOR DEFINING AND PRESENTING A COMPOSITE WEB PAGE

RELATED APPLICATIONS

This application claims priority to U.S. Provisional Application Ser. No. 60/265,223 filed Jan. 31, 2001, which is incorporated herein by reference in its entirety. The concurrently filed U.S. Non-Provisional Application entitled "System and Method For Isomorphic Data-Driven Web Page Generation" is also incorporated herein by reference in its entirety.

TECHNICAL FIELD

The present application generally relates to the field of generating and presenting information over a network. More specifically, the present application relates to a system and method for dynamically assembling and presenting selected web page content from one or more sources.

BACKGROUND

Over the last twenty years, the use of a global network of interconnected computers, commonly referred to as the "Internet" or the "World Wide Web, has increased at a tremendous rate. One particularly useful aspect of the Internet is the ability to send and retrieve information to and from third parties via web pages or electronic mail ("e-mail"). Millions of Internet users rely on this aspect of the network on a daily basis to send and receive critical business information as well as news, advertising and other information.

As user familiarity with web browser technology increases, such browsers are becoming the preferred graphical user interfaces ("GUI") for accessing remote information stores, and/or computer programs over the Internet. Information accessed this way is displayed in the form of web pages, each page generally representing a point of access.

Presentation of web pages using a web browser may be problematical in certain circumstances. For example, the traditional GUI may be cumbersome when there is a need to see information from many web pages at the same time. Another example of circumstances under which a traditional GUI presentation is cumbersome is when there is a need to have command and control of many remote applications at the same time. The presentation approach is an issue, at least in part, because a typical web page occupies a substantial portion of the space on a computer monitor screen, and it is not possible to make many web pages completely visible on a computer monitor at the same time.

One traditional solution to this presentation problem involves manually flipping through multiple web pages on a computer screen. This solution is inefficient, tedious and confusing for the user.

Another solution to this presentation problem is to have a computer programmer create a special program designed specifically to combine the relevant web pages. In order to create a composite view of a new set of web pages, new computer code is created by such programmers. Since an end-user has little control over this process, this effectively constitutes an "information publication" where the publisher of the information controls what is being seen in the resulting composite page. Consequently, such a solution is expensive, slow, and not easily repeatable. Further, such a solution has the additional disadvantage that the end user is not able to control or alter the resulting composited web page or the compositing process.

SUMMARY

This disclosure provides methods and systems for defining and presenting composite web pages in a computer processing environment. According to one aspect of the disclosure, a method for defining a composite web page is disclosed. The method includes identifying a web page which references at least one associated element, analyzing the web page to determine a list of the associated elements, presenting the list of associated elements to a user, and receiving a user selection of one or more of the associated elements from the list. The selected elements are intended to be displayed on a composite web page. The user selection is registered or stored for later reference so that a user can retrieve the composite web page without having to redefine it.

According to a second aspect of the disclosure, a method for presenting a composite web page is disclosed. The method includes receiving a user request to present a composite web page, by, for example, identifying and retrieving the elements of the composite web page, and rendering the retrieved elements to form the composite web page.

A system for defining a composite web page is also disclosed. In one embodiment, the system includes a processor and memory storing processor executable instructions for controlling the operation of the processor. The processor executable instructions include instructions to identify a web page, which references at least one associated element, instructions to analyze the web page to determine a list of the associated elements and to present the list to a user. The processor executable instructions further include instructions to receive a user selection of one or more associated elements from the list and register the user selection. The selected elements are the elements which are intended to comprise a composite web page for future presentation.

A system for presenting a composite web page is also disclosed. The system includes a processor and memory storing processor executable instructions for controlling the operation of the processor. The processor executable instructions include instructions to receive a user request to present a composite web page and to identify at least one element of the composite web page. The processor executable instructions also include instructions to retrieve the identified element(s) and render them to form the composite web page.

Computer-readable storage media are also disclosed which include processing instructions for implementing certain disclosed methods.

The disclosed systems and methods enable a user to identify selected elements of one or more relevant web pages, and combine them into a single composite web page. The features and advantages of the proposed method and system are readily apparent from the following description when taken in connection with the accompanying drawings.

BRIEF DESCRIPTION OF THE DRAWINGS

For a more complete understanding of the disclosed systems and methods, reference is now made to the following description taken in conjunction with the accompanying drawings in which like reference numbers indicate like features and wherein.

DETAILED DESCRIPTION

The methods and systems according to the present application define and present composite web pages based on stored composite page definitions. Such page definitions can be stored locally in, for example, page registry 160, as shown in FIG. 1A, or they be stored in a distributed storage medium, for example, page registry 160, as shown in FIG. 1B.

Figure 1A:
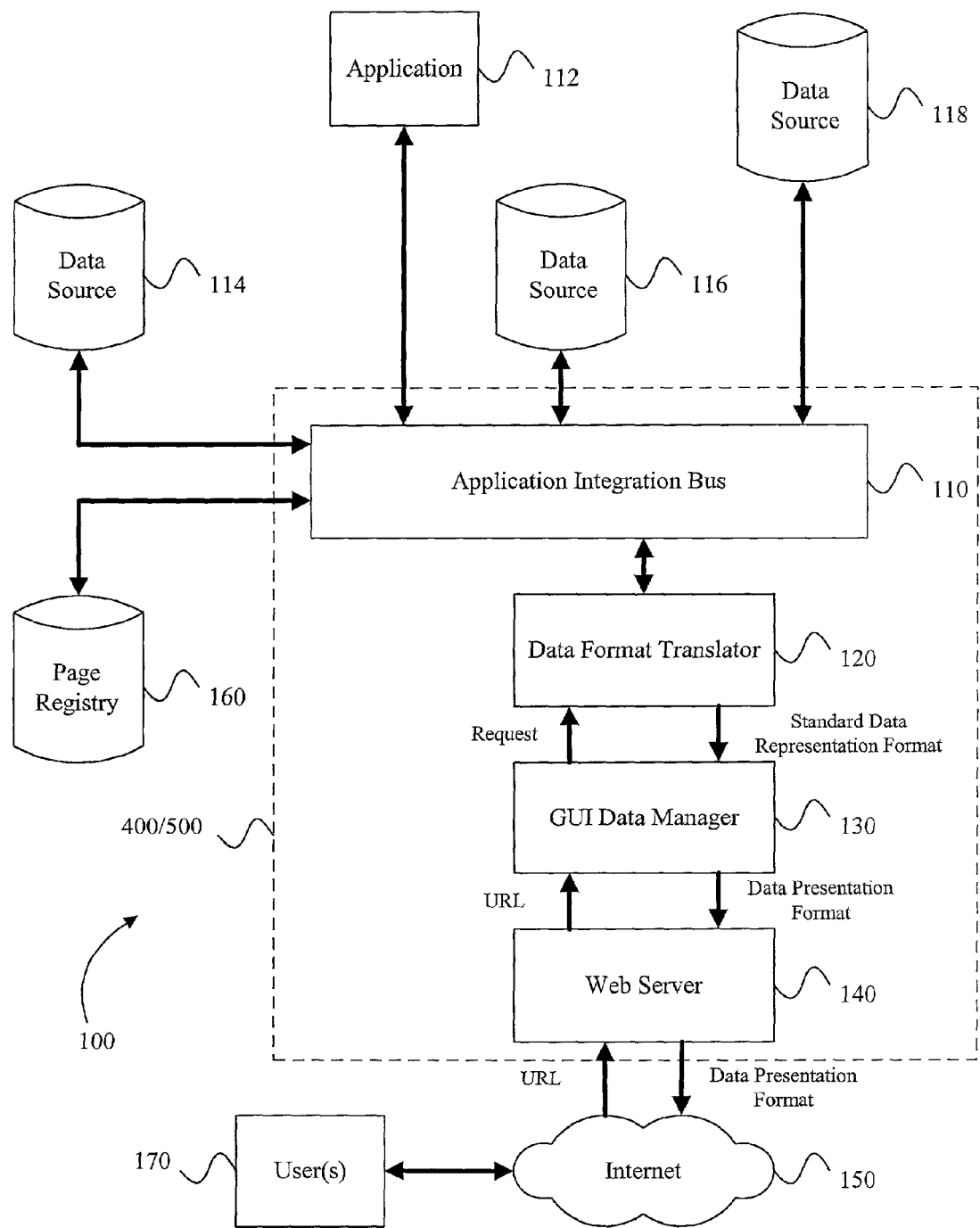
FIG. 1A is a block diagram of an exemplary environment of the disclosed system and method.
Figure 1B:
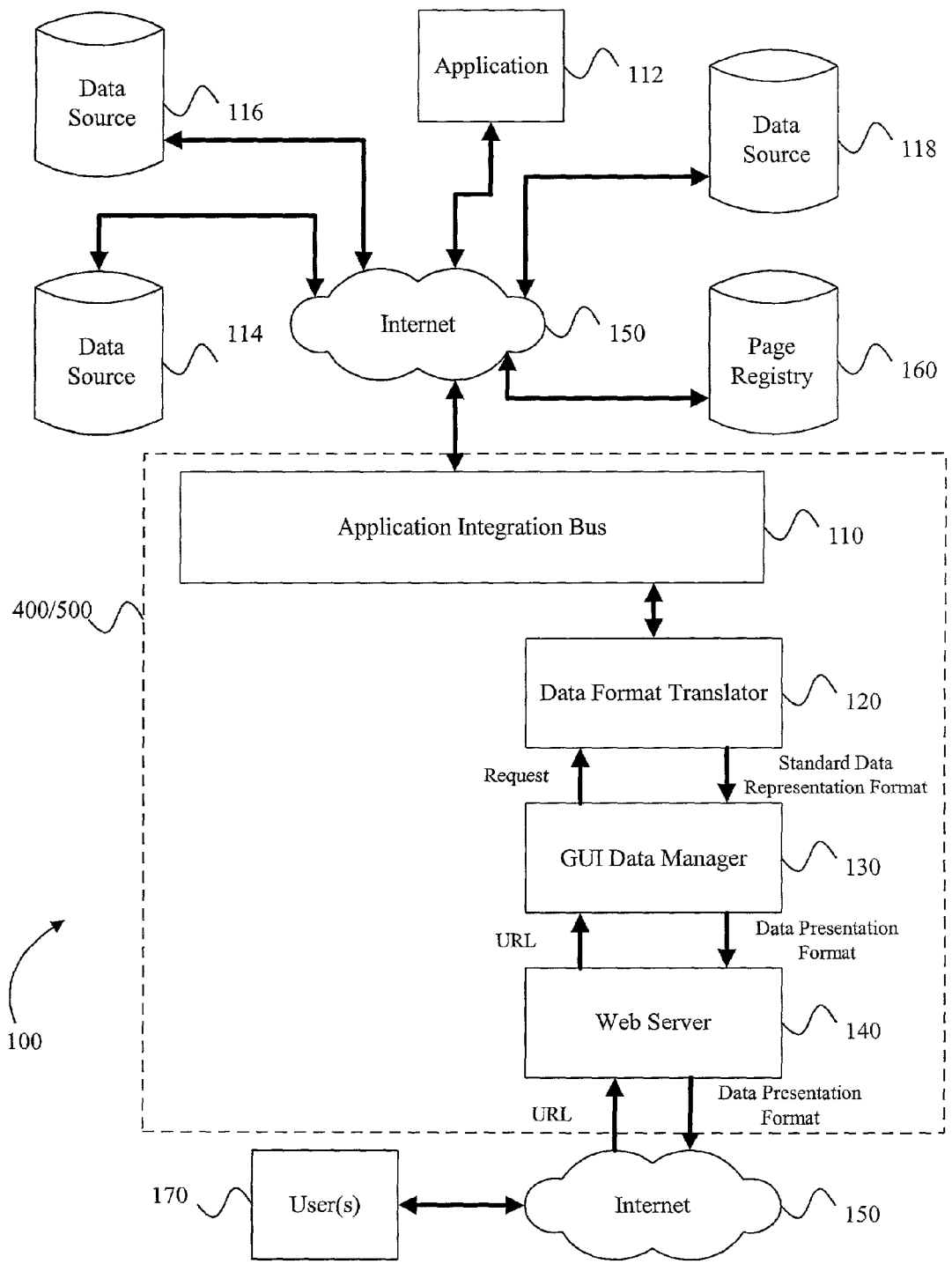
FIG. 1B is a block diagram of an alternate exemplary environment of the disclosed system and method.

Referring to FIG. 1A, there is illustrated a block diagram of an exemplary service provider system 100 for defining and presenting composite web pages. The service provider system 100 includes an Application Integration Bus 110 that is capable of storing information to and retrieving information from a variety of disparate sources including, for example, application 112, and data sources 114, 116 and 118.

The application integration bus 110 is an infrastructure that facilitates communication between different computer programs in a consistent and reliable manner. An example of a suitable application integration bus is the CA Common Services application, formerly known as Jasmine$_{ii}$, manufactured by Computer Associates International Inc., Islandia, N.Y. FIG. 1A shows the application integration bus 110 connected to the application 112, data sources 114, 116 and 118 and page registry 160 via local connections, such as POTS, wireless telephone networks, Local Area Networks ("LAN"), and Wide Area Networks ("WAN"). FIG. 1B shows the application integration bus 110 connected to the application 112, data sources 114, 116 and 118 and page registry 160 via the Internet.

Application Integration Bus 110 delivers data from the disparate sources to Data Format Translator 120, which may be a Data Format Translator or other translator providing data representation of various types of information in a standard format. For example, in one embodiment, XML is used to represent various types of information, such as documents, spreadsheets and databases.

The Data Format Translator 120 is capable of translating data in a format that is not suitable for representing information, e.g., data in a proprietary binary format, into a format that is suitable for representation (e.g., XML syntax (or data) which can represent information such as text documents, spread sheets, database information and web information). More particularly, the data format translator 120 traverses a data structure in, for example a binary form, and transforms the data structure into a format that is suitable for representation, which can be XML syntax (or data). Data Format Translator 120 uses data received from Application Integration Bus 110 to process requests and deliver data (e.g., XML data) to GUI Data Manager 130.

The GUI data manager 130 converts the data from the data format translator 120 into a format suitable for presentation to a user, e.g., HTML, PDF formats. For example, if the output of the data format translator 120 is XML data, the GUI data manager 130 could convert the XML data to HTML data, which is suitable for presentation to one or more users. In addition to interfacing with Data Format Translator 120, GUI Data Manager 130 accesses, updates and maintains web pages stored in Page Registry 160 via Application Integration Bus 110.

GUI Data Manager 130 responds to requests received from Web Server 140. The Web Server presents a Uniform Resource Locator ("URL") to GUI Data Manager 130, and the GUI Data Manager 130 responds by delivering a presentation definition of the data such as, for example, Hyper-Text Markup Language ("HTML") code. Generally, Web Server 140 provides web pages to one or more users 170 over the Internet 150.

The operation of systems 400 and 500 within the service provider system 100 illustrated in FIGS. 1A and 1B are described in greater detail with reference to FIGS. 4 and 5, respectively.

Although the described embodiment is an Internet-based web page delivery and presentation solution, it should be understood that the methods disclosed herein may also be applied to other systems. For example, wireless telephone networks, LAN's, WAN's, Extranets and Intranets, as well as other types of networks, could all support the disclosed methods.

Figure 2:
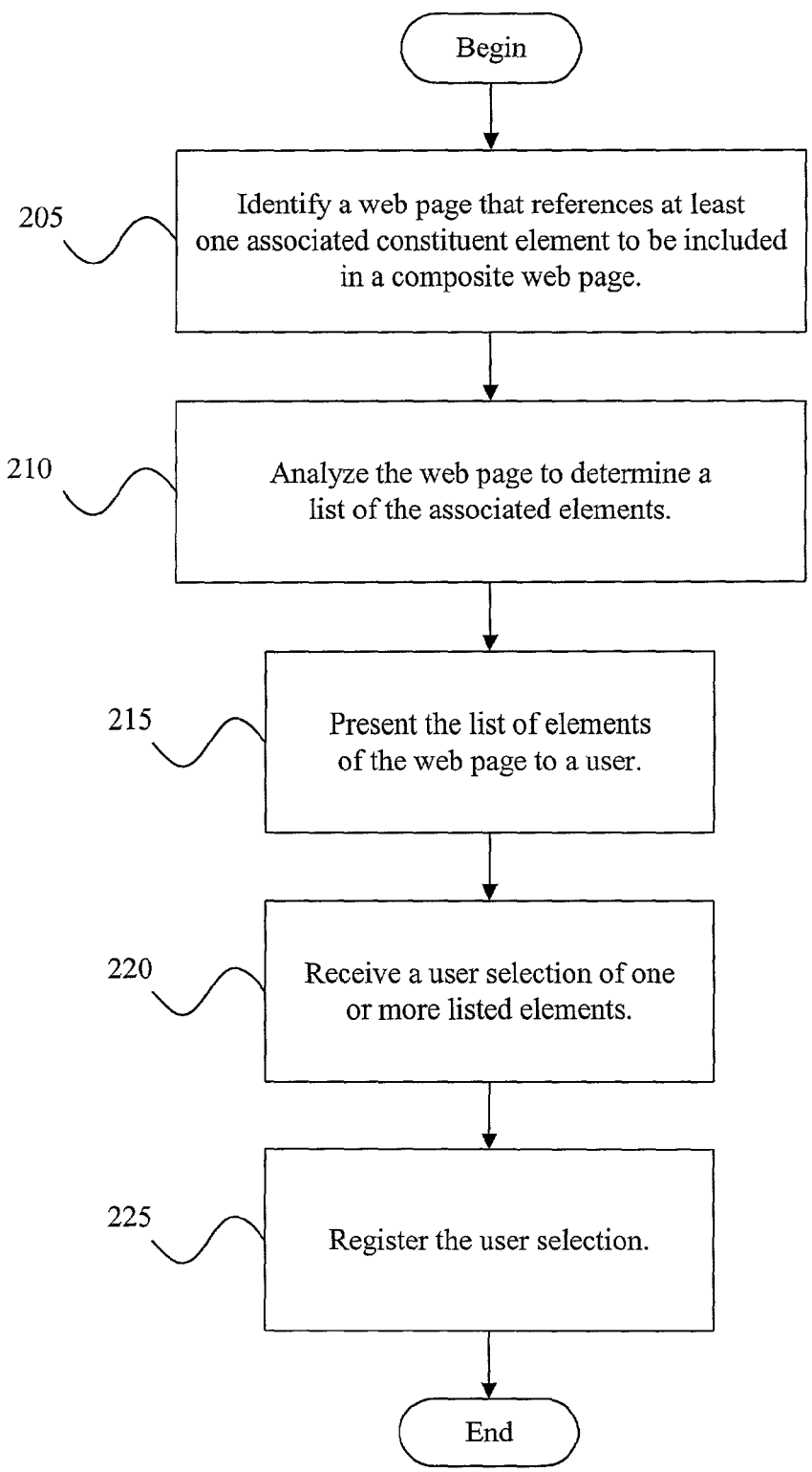
FIG. 2 is an exemplary methodology for defining a composite web page in accordance with one embodiment of the disclosed method.

Referring now to FIG. 2, there is illustrated a flowchart describing the operation of one methodology for defining a composite web page. At block 205, the system identifies a web page from which one or more elements will be extracted for use in a composite web page. The set of web pages that may be used by the system includes any web page that may be parsed into it's constituent elements. Of course, plug-ins may be utilized to parse specific types of data on web pages. The system may identify the web page, for example, using a URL supplied by a user, such as through typing, copying or dragging a URL displayed in a browser and dropping it into a work area. The identified web page references at least one associated element. An elements of a web page may be, for example, a text block, a table, a digital image, or a grouping of such items from a tree structure defining the web page. For example, an element of a page http://www.msnbc.com may be a digital photograph associated with a lead news story, or a set of current headlines. The system analyzes the web page to determine a list of associated elements, as shown by block 210. The analysis may include parsing HTML source code of the identified web page, although any other technique for determining an element list would be acceptable.

At block 215, the system presents the list of elements from the identified web page to a user. The list may be embodied, for example, as a textual list, a graphical set of icons or the list may be formatted to provide the appearance of the actual web page, among other things. In one embodiment, the listed elements are presented to the user in the form of a tree structure, shown in FIG. 6. While presentation of the list in other ways, such as using icons or using a simple list, for example, would be sufficient, presentation of the list in the form of a tree structure provides a user with a view of the relationships between elements.

The system allows the user to select one or more listed elements or parts of the identified web page that the user is particularly interested in viewing as part of a composite web page. At block 220, the system receives from the user a selection of one or more elements that will form at least a portion of the composite web page.

Upon the selection of one or more elements by the user, the system registers the user selection, as shown by block 225. The registration of the user selection includes persistently storing the selection. Such persistent storage may be accomplished using a local registry or a registry on a remote server.

The registration of the user selection includes creating a specification that includes data defining the composite web page including an identification of the selected elements. Registration further includes transmitting the specification over the Internet, and storing the specification in a persistent registry, such as page registry 160. The specification may include information regarding how to fetch the web page in its entirety, and/or information how to extract each selected element from the web page. The specification may include data not only identifying the selected elements of the composite web page, but also data identifying the source web page for each selected element. The specification may also include information regarding how to retrieve the source web pages and extract each selected element from its associated source web page.

It should be appreciated that while the methodology of FIG. 2 is described with respect to a single identified web page, the methodology may also be used to define a composite page comprising elements from multiple identified web pages. In one alternative approach, more than one web page may be identified and analyzed at blocks 205 and 210, and the system presents a master list of elements to the user for selection. The master list may include, for example, some identification regarding the web page to which each element is associated. This may be accomplished by segmenting or sorting the list of elements, accordingly.

Figure 6:
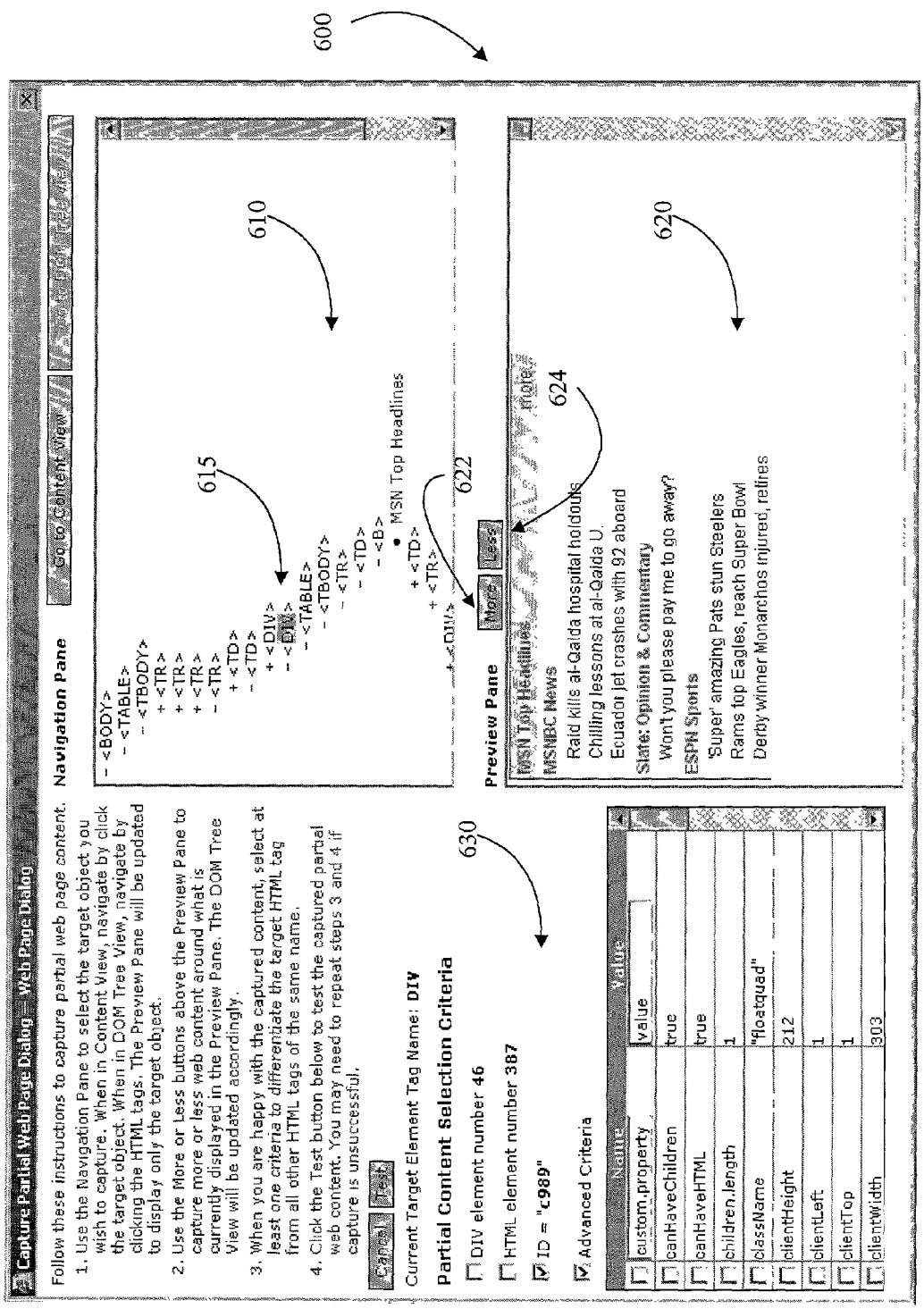
FIG. 6 is a computer screen display illustrating an exemplary graphical user interface for defining a composite web page.

Alternatively, the system may present a separate list of elements for each identified web page. In such an embodiment, the user may select elements from among the plurality of element lists to define the composite web page. The graphical user interface for selecting elements according to such an embodiment is illustrated in FIG. 6.

It should be further appreciated that in an alternate embodiment, the methodology may include determining an identifier associated with the user. Examples of such an identifier include, the logon name of a user, a role or position of employment associated with a user, and an identifier associated with a particular network node or computer. The identifier may be stored in the registry to associate the composite web page with the user.

Figure 3:
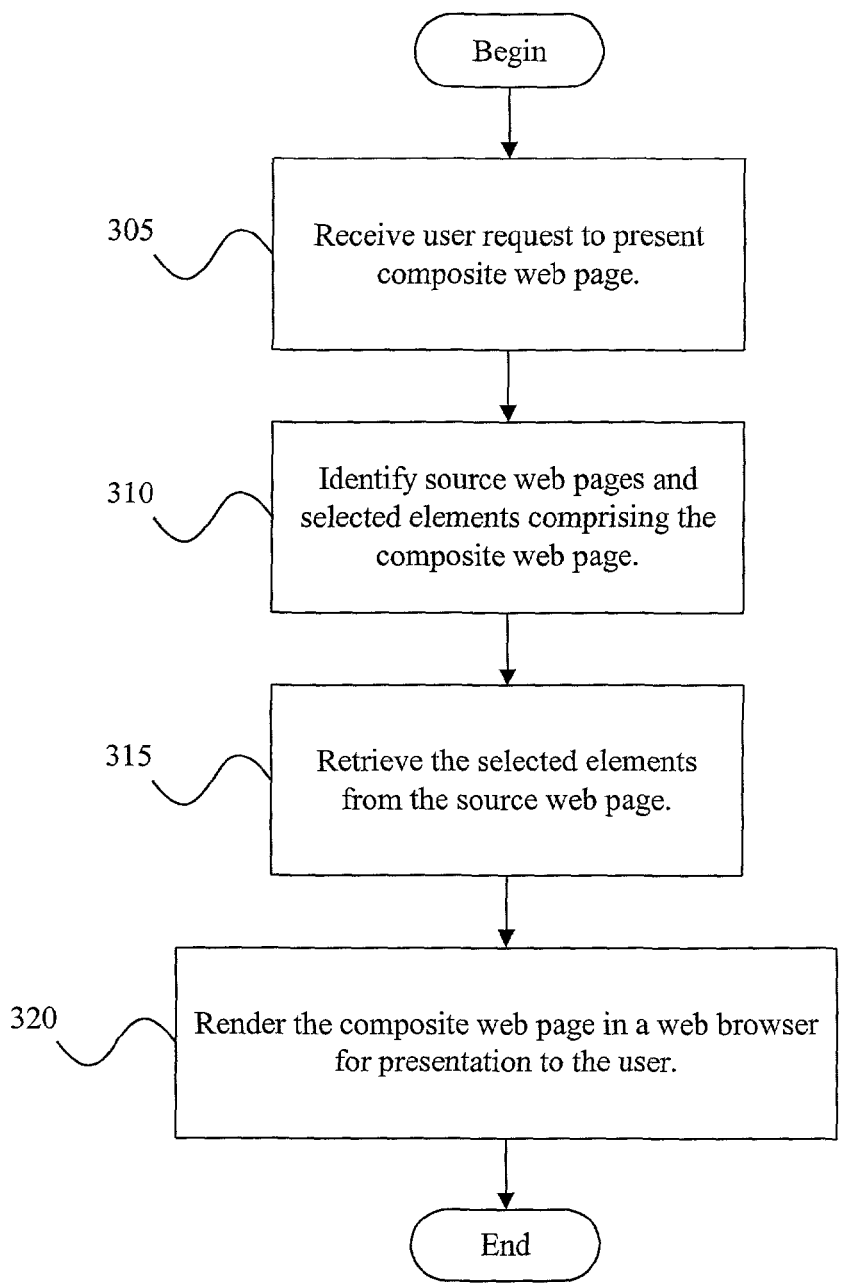
FIG. 3 is an exemplary methodology for presenting a composite web page in accordance with one embodiment of the disclosed method.

Referring now to FIG. 3, there is illustrated a flowchart describing the operation of one methodology for presenting a composite web page. At block 305, the system receives a user request to present a previously defined composite web page. The composite web page may have been previously defined in accordance with the methodology of FIG. 2, or it could have been defined in accordance with another methodology that results in a stored composite web page definition.

The system identifies the selected elements that comprise the composite web page at block 310 and retrieves the selected elements at block 315. In one embodiment, identification of the selected elements 310 is accomplished by accessing a persistent registry, such as page registry 160 and retrieving a specification containing data defining the composite web page.

After a selected element has been identified, the system may retrieve it for inclusion in the composite web page. In one embodiment, the system retrieves the latest versions of each source web page that contains an element selected for presentation on the composite web page, according to information stored in the registry. Each selected element is extracted from its associated source web page, based on the specification of the composite page.

At block 320, the system renders the composite page in a web browser for presentation to the user. It should be appreciated that the rendering of the composite web page, including for example the relative placement of the selected elements, may be performed in accordance with instructions or data stored in the specification. The stored instructions or data may be defined by a user during a composite page definition process or may be automatically determined based on one or more factors, including certain characteristics of the selected elements, such as display size, data refresh requirements, frequency of use or preferred layering order (or z-order).

In another embodiment, the rendering of the composite web page may be automatically determined at the time of rendering. In this embodiment, the automatic determination may be based on one or more run-time variables, such as, for example, the dimensions of a window containing the composite web page.

According to one embodiment, the methodology for presenting a composite web page to a user includes determining an identifier associated with the user and accessing the registry is based on the identifier. Determining such a user identifier enables the user to request a composite web page that has been tailored to the specific needs of the user. In addition, in embodiments in which the page registry is stored on a remote server, the user is able to request the composite page to be displayed regardless of the particular local computer the user is operating, as long as the local computer is able to access the registry on the remote server, for example, using the Internet.

Figure 4:
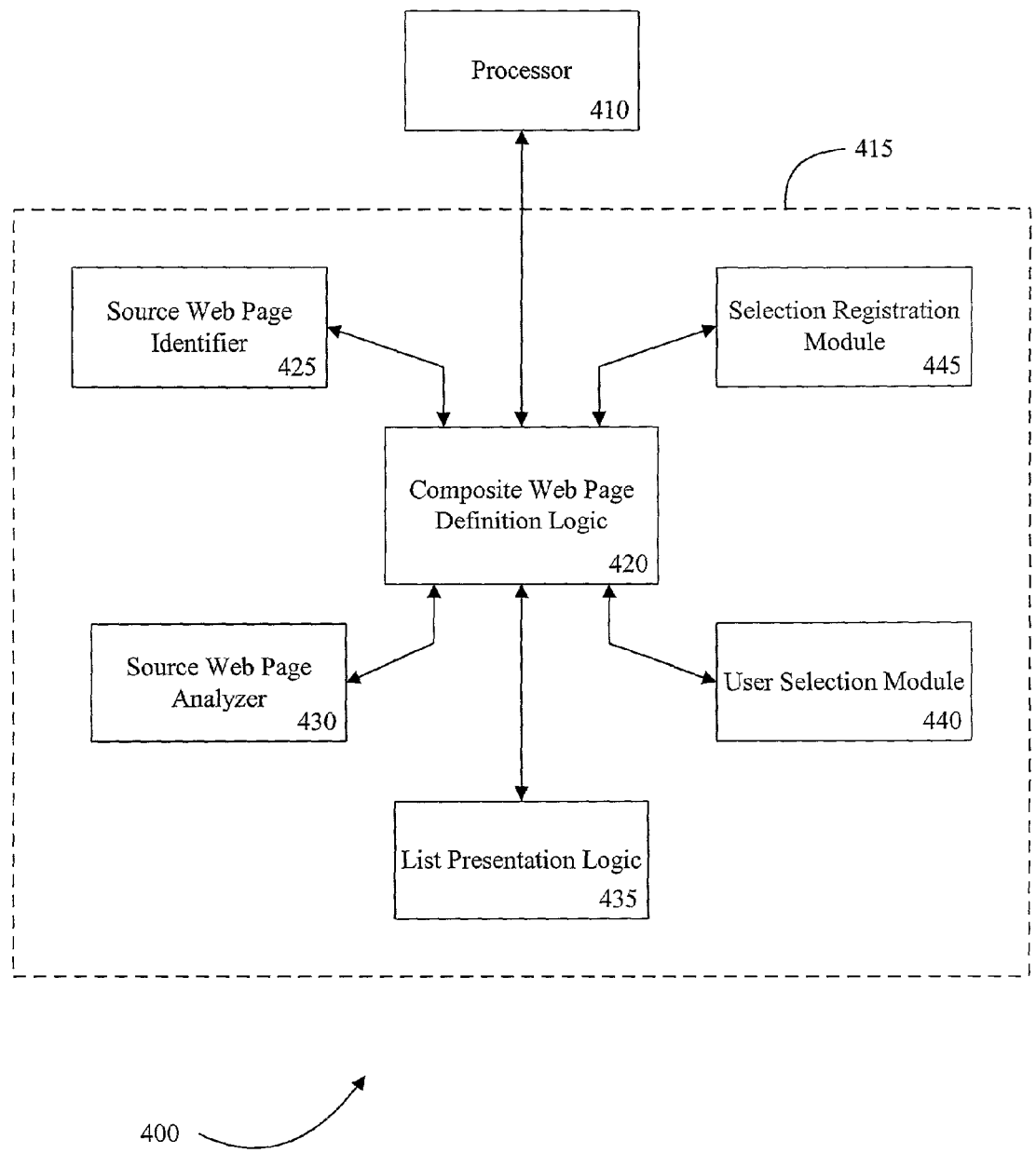
FIG. 4 is a block diagram illustrating a system for defining a composite web page in accordance with one embodiment of the disclosure.

In FIG. 4 there is illustrated one embodiment of a system for defining a composite web page 400. As shown, the system includes a processor 410 and memory 415. The memory 415 is connected to the processor 410 and stores processor executable instructions for defining a composite web page.

The memory 415 includes composite web page definition logic 420 for enabling a user to define a composite web page. The composite web page definition logic 420 employs a source web page identifier 425 to identify one or more source web page containing element(s) that the user elects to include in a composite web page. The definition logic 420 also employs a source web page analyzer 430 and list presentation logic 435 to respectively analyze the source web pages to identify a list of associated elements and present the list to the user. A user selection module 440 is used by the definition logic 420 to enable the user to select listed elements for inclusion in the composite web page.

The composite web page definition logic registers the user selection of elements using a selection registration module 445. In one embodiment, selection registration module 445 creates a specification of the selected elements, transmits the specification over the Internet, and stores the specification in a persistent registry, such as page registry 160 (shown in FIG. 1). Of course, in an alternate embodiment, the persistent registry may reside locally on the user's computer. The specification may include information regarding how to fetch the web page in its entirety, as well as how to extract each selected element from the web page.

Figure 5:
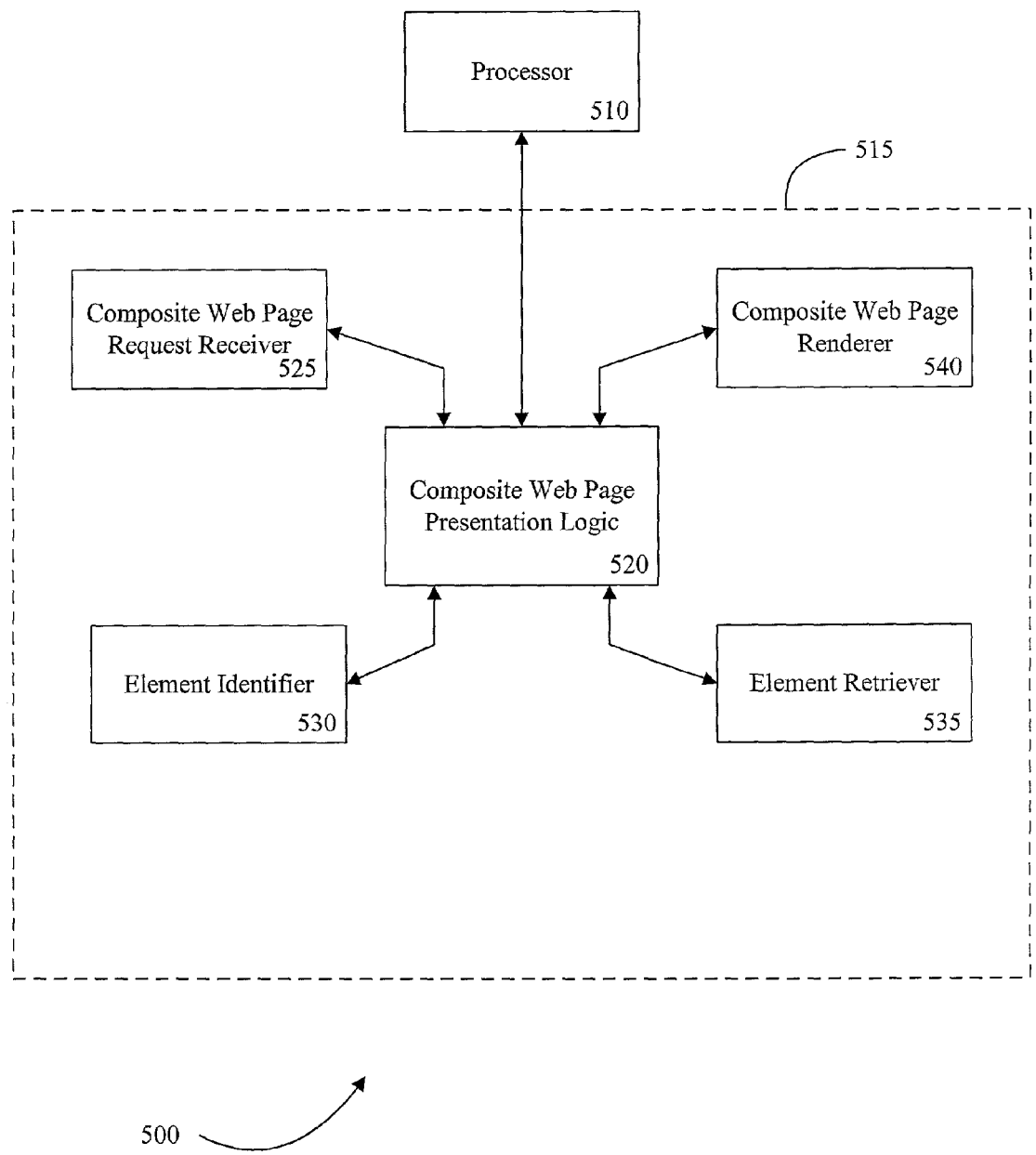
FIG. 5 is a block diagram illustrating a system for presenting a composite web page in accordance with one embodiment of the disclosure.

In FIG. 5 there is illustrated one embodiment of a system for presenting a previously defined composite web page 500. As shown, the system includes a processor 510 and memory 515. The memory 515 is connected to the processor 510 and stores processor executable instructions for presenting the composite web page.

The memory 515 includes composite web page presentation logic 520 for presenting the composite web page to a user. The composite web page presentation logic 520 employs a composite web page request receiver 525 to receive a request for presentation of the composite web page. The presentation logic 520 also employs an element identifier 530 to identify the elements associated with the requested composite web page. In one embodiment, element identifier 530 accesses a persistent registry, such as page registry 160 (shown in FIG. 1) and retrieves a specification containing data defining the composite web page. The specification may include data not only identifying the selected elements of the composite web page, but also data identifying the source web page for each selected element. The specification may further include information regarding how to retrieve the source web pages and extract each selected element from its associated source web page.

An element retriever 535 retrieves the element(s) identified by element identifier 530. In a one embodiment, element retriever 535 retrieves the latest versions of each source web page that contains an element selected for presentation on the composite web page, according to information stored in the registry. Each selected element is extracted from its associated source web pages, based on the specification of the composite page.

Composite web page presentation logic 520 utilizes a composite web page renderer 540 to display the web page for the user. In one embodiment, renderer 540 determines the relative placement of the selected elements, which may be performed in accordance with instructions or data stored in the specification. The stored instructions or data may be defined by a user during a composite page definition process or may be automatically determined based on one or more factors, including certain characteristics of the selected elements. In another embodiment, renderer 540 automatically determines the placement of elements at the time of rendering. In this embodiment, automatic determination may be based on one or more run-time variables, such as, for example, the dimensions of a window containing the composite web page.

In alternative embodiments, the systems illustrated in FIGS. 4 and 5 may be embodied as computer readable code stored on a computer readable medium. The code may include one or more computer/processor executable instructions that cause the computer to act in a selected manner. The computer readable medium may be an optical storage device such as a CD-ROM or DVD-ROM, a magnetic storage device such as a hard disk or floppy disk, an electronic storage device such as a memory card, RAM, ROM, EPROM, EEPROM, or flash memory, or any other storage device capable of storing computer readable processor instructions.

Referring now to FIG. 6, there is shown a computer screen display 600 illustrating an exemplary graphical user interface for defining a composite web page. Display 600 is a web page dialog that is presented upon user selection of a web page to include in a composite web page.

Display 600 includes a navigation page 610 that displays the constituent elements of the selected web page. In the illustrated example, the elements of the selected web page are displayed in a tree format according to the source HTML code of the selected web page. The navigation pane enables the user to select a portion of the selected web page for inclusion in the composite web page. In the illustrated example, the user has made a selection 615.

The presentation associated with the selection 615 is displayed in preview pane 610. Preview pane 620 presents a graphical preview of a selected portion of the web page to provide the user with visual verification the selection 615 is appropriate for the user's purposes. To enlarge or reduce the scope of the selection, the user may click buttons 622 or 624, respectively.

Figure 7:
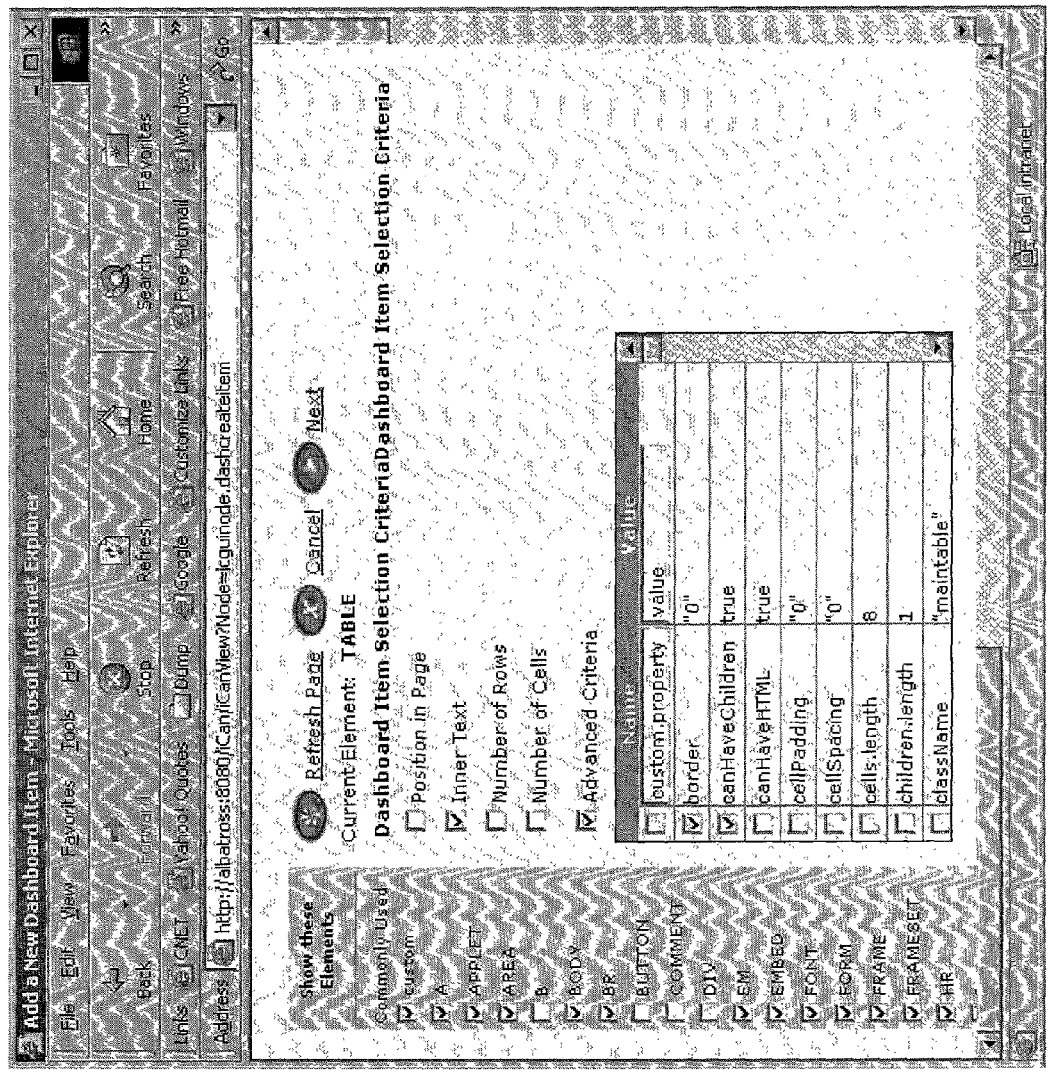
FIG. 7 is a computer screen display illustrating a portion of the data included in a specification.

Display 600 further includes area 630 for displaying the partial content selection criteria. Area 630 may be used to assist the presentation system 500 in identifying the selected elements. This is particularly useful with regard to web pages that are dynamic, such as, for example, pages that display news or other pages that may be frequently updated. The partial content selection criteria defined at 630, may define at least a portion of the specification associated with the content. An example of the specification data is illustrated in FIG. 7.

Figure 8:
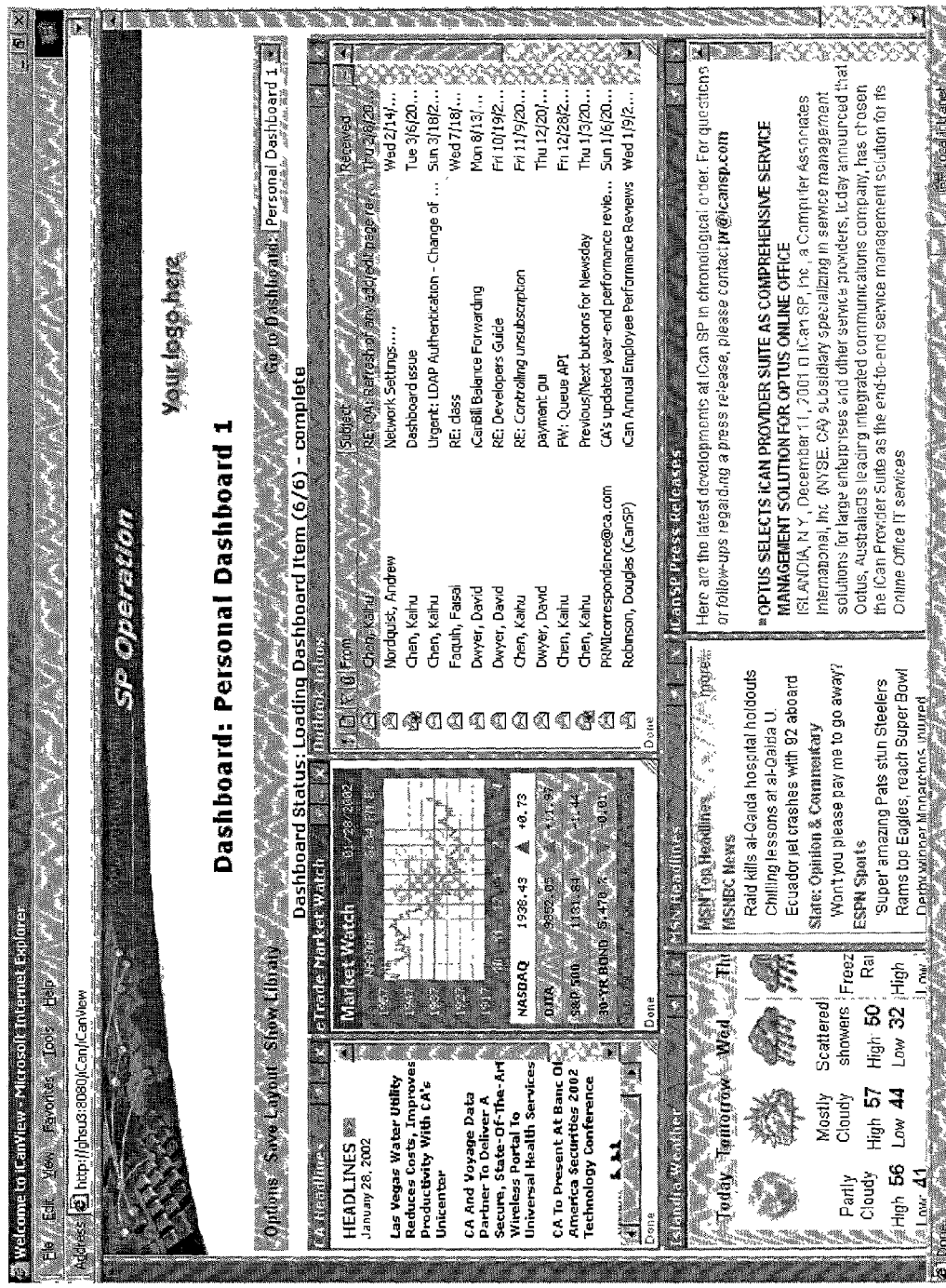
FIG. 8 is a computer screen display illustrating the presentation of a composite web page.

FIG. 8 is a computer screen display 800 illustrating the presentation of a composite web page. Display 800 is an exemplary result of methodology 300 performed by system 500. The selection illustrated in FIG. 6 is displayed as part of a composite web page at 810.

While the disclosed systems and methods may be employed at a single enterprise to assist its users, it is also envisioned that the disclosed systems and methods could be made available by a service provider over the Internet. By accessing a web site employing an applet implementing the methods of the disclosed methods, a service provider may allow the public to create their own composite views of other web pages. Such a web site may derive its revenue from the traffic generated from such a service, for example, by charging a nominal subscription fee, or by generating revenue from advertisements. In addition, such a web site may also serve as a "portal" to other web sites, and derive revenue from producing pre-defined composite views available to its users, and/or charge a fee for other company's content to be included in such a composite view. In another embodiment, a service provider maintaining such a web site may accept subscriptions from other companies, so that a composite web page with content specificied by such a company may be made available, for example, to a specific group of individual users, to the general public, or to other companies, such as for business-to-business purposes.

Unlike typical web portal businesses, such as yahoo.com or msn.com, a business method employing the disclosed methods and systems enable the user to create a composite view of any web pages over the Internet, by simply connecting to a web site and using the service provided.

Although the disclosed systems and methods have been described in terms of specific embodiments and applications, persons skilled in the art can, in light of this teaching, generate additional embodiments, including various changes, substitutions and alterations, without exceeding the scope or departing from the spirit of the disclosure. Accordingly, it is to be understood that the drawing and description in this disclosure are proffered to facilitate comprehension of the systems and methods, and should not be construed to limit the scope thereof.

What is claimed is:

1. A method for defining a composite web page, comprising:
   identifying a web page;
   analyzing the web page to determine a list of HTML tags, each HTML tag corresponding to a particular portion of the content of the identified web page;
   presenting the determined list of HTML tags to a user in a navigation pane of a first computer, the navigation pane presenting the determined list of HTML tags in the form of a tree structure that provides a visual representation of relationships between the HTML tags corresponding to particular portions of the content of the identified web page, the navigation pane operable to allow the user to view and select one or more of the HTML tags corresponding to particular portions of the content of the identified web page from the determined list of HTML tags;

receiving, from the first computer, a user selection of at least one HTML tag from the determined list of HTML tags in the form of the tree structure;

in response to receiving the user selection of the at least one HTML tag, presenting, in a preview pane of the first computer, the particular portion of the content of the identified web page corresponding to the at least one selected HTML tag from the determined list of HTML tags, the preview pane operable to allow the user to visually verify the user selection;

registering the user selection of the at least one HTML tag from the determined list of HTML tags; and rendering the identified portion of content corresponding to the at least one HTML tag to form the composite web page for display on a second computer, the placement of the identified portion of content on the composite web page determined automatically, at the time of rendering and when the composite webpage is requested, based on one or more run-time variables comprising the dimensions of a window to display the composite web page on the second computer.

2. The method of claim 1, wherein registering includes storing the user selection in a local registry.

3. The method of claim 1, wherein registering includes transmitting the user selection to a remote server for storage.

4. The method of claim 1, further comprising creating a specification, the specification including data defining how to fetch at least one web page associated with the selected HTML tags and how to extract the selected HTML tags.

5. The method of claim 1, wherein identifying the web page includes identifying a plurality of web pages; and wherein the list includes HTML tags corresponding to particular portions of the content of each of the plurality of web pages.

6. The method of claim 5, further including defining segments of the list according to each of the plurality of web pages.

7. The method of claim 6 where presenting includes presenting each of the segments of the list at separate times.

8. The method of claim 1, further comprising determining an identifier associated with the user and wherein registering includes storing the identifier.

9. The method of claim 1, wherein analyzing the web page includes parsing HTML source code of the web page.

10. The method of claim 1, further comprising:
storing the user selection of the at least one HTML tag from the determined list of HTML tags on a remote server; and
enabling the display of the composite web page on any Internet-enabled any computer that the user is operating.

11. A method for presenting a composite web page, comprising:
receiving a user request to present a composite web page, the composite web page defined by:
analyzing an identified web page to determine a list of HTML tags, each HTML tag corresponding to a particular portion of the content of the identified web page;
presenting the determined list of HTML tags to a user in a navigation pane of a first computer, the navigation pane presenting the determined list of HTML tags in the form of a tree structure that provides a visual representation of relationships between the HTML tags corresponding to particular portions of the content of the identified web page, the navigation pane operable to allow the user to view and select one or more of the HTML tags corresponding to particular portions of the content of the identified web page from the determined list of HTML tags; and
receiving, from the first computer, a user selection of at least one HTML tag from the determined list of HTML tags in the form of the tree structure;
identifying the particular portion of content corresponding to at least one HTML tag of the composite web page;
retrieving the particular portion of content corresponding to the at least one identified HTML tag; and
rendering the identified portion of content corresponding to the at least one HTML tag to form the composite web page for display on a second computer, the placement of the identified portion of content on the composite web page determined automatically, at the time of rendering and when the composite webpage is requested, based on one or more run-time variables comprising the dimensions of a window to display the composite web page on the second computer.

12. The method of claim 11, wherein identifying includes accessing a registry.

13. The method of claim 12, wherein identifying includes:
determining an identifier associated with the user; and
accessing the registry is based on the identifier.

14. The method of claim 11, wherein retrieving includes:
retrieving a web page associated with the particular portion of content corresponding to the at least one identified HTML tag; and
extracting the particular portion of content corresponding to the at least one identified HTML tag from the associated web page.

15. The method of claim 11, wherein identifying includes:
accessing a registry, the registry including data defining the position of each portion of content; and
wherein rendering includes displaying each portion of content according to the data.

16. The method of claim 11, wherein analyzing the web page includes parsing HTML source code of the web page.

17. The method of claim 11, further comprising storing the user selection of the at least one HTML tag from the determined list of HTML tags on a remote server, and wherein rendering the identified portion of content to form the composite web page comprises rendering the composite web page for display on any Internet-enabled any computer that the user is operating.

18. A system for defining a composite web page, comprising:
a processor;
a memory coupled to the processor storing processor executable instructions to control the operation of the processor;
the processor executable instructions including:
instructions to identify a web page;
instructions to analyze the web page to determine a list of HTML tags, each HTML tag corresponding to a particular portion of the content of the identified web page;
instructions to present the determined list of HTML tags to a user in a navigation pane of a first computer, the navigation pane presenting the determined list of HTML tags in the form of a tree structure that provides a visual representation of relationships between the HTML tags corresponding to particular portions of the content of the identified web page, the navigation pane operable to allow the user to view and select one or more of the HTML tags corresponding to particular portions of the content of the identified web page from the determined list of HTML tags;

instructions to receive, from the first computer, a user selection of at least one HTML tag from the determined list of HTML tags in the form of the tree structure;

instructions to present in response to receiving the user selection of the at least one HTML tag, in a preview pane, the particular portion of the content of the identified web page corresponding to the at least one selected HTML tag from the determined list of HTML tags, the preview pane operable to allow the user to visually verify the user selection;

instructions to register the user selection of the at least one HTML tag from the determined list of HTML tags;

instructions to render the identified portion of content corresponding to the at least one HTML tag to form the composite web page for display on a second computer, the placement of the identified portion of content on the composite web page determined automatically, at the time of rendering and when the composite webpage is requested, based on one or more run-time variables comprising the dimensions of a window to display the composite web page on the second computer.

19. The system of claim 18, wherein the processor executable instructions to register the user selection of the at least one HTML tag comprises instructions to store the user selection of the at least one HTML tag on a remote server, and wherein the processor executable instructions further include:

instructions to display the composite web page on any Internet-enabled any computer that the user is operating.

20. A system for presenting a composite web page, comprising:

a processor;

a memory coupled to the processor storing processor executable instructions to control the operation of the processor;

the processor executable instructions including:

instructions to receive a user request to present a composite web page, the composite web page defined by:

analyzing an identified web page to determine a list of HTML tags, each HTML tag corresponding to a particular portion of the content of the identified web page;

presenting the list of determined HTML tags to a user in a navigation pane of a first computer, the navigation pane presenting the determined list of HTML tags in the form of a tree structure that provides a visual representation of relationships between the HTML tags corresponding to particular portions of the content of the identified web page, the navigation pane operable to allow the user to view and select one or more of the HTML tags corresponding to particular portions of the content of the identified web page from the determined list of HTML tags; and receiving, from the first computer, a user selection of at least one HTML tag from the determined list of HTML tags in the form of the tree structure;

in response to receiving the user selection of the at least one HTML tag, presenting, in a preview pane, the particular portion of the content of the identified web page corresponding to the at least one selected HTML tag from the determined list of HTML tags, the preview pane operable to allow the user to visually verify the user selection;

registering the user selection of the at least one HTML tag from the determined list of HTML tags;

instructions to identify the particular portion of content corresponding to at least one HTML tag of the composite web page;

instructions to retrieve the particular portion of content corresponding to the at least one HTML tag; and instructions to render the identified portion of content corresponding to the at least one HTML tag to form the composite web page for display on a second computer, the placement of the identified portion of content on the composite web page determined automatically, at the time of rendering and when the composite webpage is requested, based on one or more run-time variables comprising the dimensions of a window to display the composite web page on the second computer.

21. The system of claim 20, wherein:

registering the user selection of the at least one HTML tag comprises storing the user selection of the at least one HTML tag on a remote server; and wherein the processor executable instructions further include instructions for displaying the composite web page on any Internet-enabled any computer that the user is operating.

22. A computer-readable storage medium encoded with processing instructions for defining a composite web page, including:

computer readable instructions for identifying a web page;

computer readable instructions for analyzing the web page to determine a list of HTML tags, each HTML tag corresponding to a particular portion of the content of the identified web page;

computer readable instructions for presenting the list to a user in a navigation pane of a first computer, the navigation pane presenting the determined list of HTML tags in the form of a tree structure that provides a visual representation of relationships between the HTML tags corresponding to particular portions of the content of the identified web page, the navigation pane operable to allow the user to view and select one or more of the HTML tags corresponding to particular portions of the content of the identified web page from the determined list of HTML tags;

computer readable instructions for receiving, from the first computer, a user selection of at least one HTML tag from the list of HTML tags in the form of the tree structure;

computer readable instructions for presenting in response to receiving the user selection of the at least one HTML tag, in a preview pane, the particular portion of the content of the identified web page corresponding to the at least one selected HTML tag from the determined list of HTML tags, the preview pane operable to allow the user to visually verify the user selection;

computer readable instructions for registering the user selection of the at least one HTML tag from the determined list of HTML tags; and computer readable instructions for rendering the identified portion of content corresponding to the at least one HTML tag to form the composite web page for display on a second computer, the placement of the identified portion of content on the composite web page determined automatically, at the time of rendering and when the composite webpage is requested, based on one or more run-time variables comprising the dimensions of a window to display the composite web page on the second computer.

23. The computer-readable storage medium of claim 22, further including:
   computer readable instructions for storing the user selection of the at least one HTML tag from the determined list of HTML tags on a remote server; and
   computer readable instructions for displaying the composite web page on any Internet-enabled any computer that the user is operating.

24. A computer-readable storage medium encoded with processing instructions for presenting a composite web page, including:
   computer readable instructions for receiving a user request to present a composite web page, the composite web page defined by:
      analyzing an identified web page to determine a list of HTML tags, each HTML tag corresponding to a particular portion of the content of the identified web page;
      presenting the list of determined HTML tags to a user in a navigation pane of a first computer, the navigation pane presenting the determined list of HTML tags in the form of a tree structure that provides a visual representation of relationships between the HTML tags corresponding to particular portions of the content of the identified web page, the navigation pane operable to allow the user to view and select one or more of the HTML tags corresponding to particular portions of the content of the identified web page from the determined list of HTML tags; and
      receiving, from the first computer, a user selection of at least one HTML tag from the determined list of HTML tags in the form of the tree structure;
   computer readable instructions for identifying the particular portion of content corresponding to at least one HTML tag of the composite web page;
   computer readable instructions for retrieving the particular portion of content corresponding to the at least one identified HTML tag; and
   computer readable instructions for rendering the identified portion of content corresponding to the at least one HTML tag to form the composite web page for display on a second computer, the placement of the identified portion of content on the composite web page determined automatically, at the time of rendering and when the composite webpage is requested, based on one or more run-time variables comprising the dimensions of a window to display the composite web page on the second computer.

25. The computer-readable storage medium of claim 24, further including:
   computer readable instructions for storing the user selection of the at least one HTML tag from the determined list of HTML tags on a remote server; and
   computer readable instructions for displaying the composite web page on any Internet-enabled any computer that the user is operating.

\* \* \* \* \*